Jan. 15, 1929.  1,699,224

D. F. COMSTOCK

HEADLIGHT SCREEN OR LENS

Filed May 23, 1922  2 Sheets-Sheet 1

Inventor
Daniel F. Comstock
by Roberts Roberts & Cushman
Attorneys

Jan. 15, 1929. 1,699,224

D. F. COMSTOCK

HEADLIGHT SCREEN OR LENS

Filed May 23, 1922    2 Sheets-Sheet 2

Inventor
Daniel F. Comstock
by Roberts Roberts Cushman
Attorneys

Patented Jan. 15, 1929.

1,699,224

UNITED STATES PATENT OFFICE.

DANIEL F. COMSTOCK, OF CAMBRIDGE, MASSACHUSETTS, ASSIGNOR TO COMSTOCK & WESCOTT, INC., OF BOSTON, MASSACHUSETTS, A CORPORATION OF MASSACHUSETTS.

HEADLIGHT SCREEN OR LENS.

Application filed May 23, 1922. Serial No. 562,989.

This invention relates particularly to headlight screens or lenses of the type adapted to be mounted in the front opening of a headlight for the purpose of spreading the light, bending it downwardly, or otherwise controlling the distribution properly to illuminate the field and minimize the glaring effect. However, it will be evident that, in its broader aspect, the invention comprehends lenses or refractors adapted for various uses.

Objects of the invention are to provide a screen or lens which is light in weight and relatively thin and which can be packed and shipped in less space and with less danger of breakage than the ordinary all-glass lens. Another object is to provide a screen in which the lens formation does not comprise such wide differences in thickness as to involve deep grooves or depressions and high ridges or protuberances.

In one aspect the present invention comprises a light-transmissive plate of glass or other suitable material and a relatively soft coating of light-transmissive material, such as gelatin or other collodial substance, the coating having parallel refractive sections adapted to alter the directional characteristics of the light passing therethrough. In the case of a light-spreading screen the refractive sections may be in the form of cylindrical lenses, that is, generally cylindrical in contour although not necessarily exactly cylindrical, and either concave or convex or alternately concave and convex in the general form of a sinusoidal curve; an essential characteristic residing in the parallel arrangement of the refractors, that is, generally parallel and not necessarily exactly parallel, whereby the light is bent or spread predominantly in one dimension. In the case of a screen for downwardly bending the light to avoid glaring effects the lens formation may be in the form of a series of sections having inclined boundaries or prismatic surfaces.

Certain of the objects of the invention are attained by making the refractors of small cross-sectional dimensions, e. g. of the order of a few hundredths of an inch wide and a few thousandths of an inch thick, these small dimensions being made possible by the method of manufacture constituting a part of this invention.

In another aspect the invention consists of a lens or screen comprising a series of light-indurated colloid refractors, preferably integrally connected together and preferably supported on a light-transmissive plate as aforesaid.

The method of making the aforesaid lens or screen, which constitutes a part of the present invention, comprises exposing a light-sensitive layer of light-transmissive material in varying degrees throughout its area depending upon the lens formation desired, and subsequently treating the exposed and unexposed portions of the layer selectively to develop the lens formation. For example, with the light-sensitive layer in the form of a coating on a glass or other plate it is possible so to treat the layer that, as a result of the action of light, the outer portion of the light-sensitive layer may be dissolved off leaving the portion next to the plate in relief. Either the exposed or the unexposed portions of the layer may be dissolved off, the layer being exposed through the plate if the unexposed portion is to be etched off and from the opposite side if the exposed portion is to be removed, whereby the remaining portion is left adhering to the plate. One simple and effective way of effecting the selective removal of a part of the light-sensitive layer is to form the light-sensitive layer of bichromated gelatine wherein the exposed portions are hardened directly by light (in contradistinction to a photographic emulsion in which the exposed portions do not harden or otherwise become selectively separable from the unexposed portions until after development or other intermediate treatment), then to expose the layer through the plate, and subsequently to dissolve off the soft unexposed portions.

In order to illustrate the invention I have shown certain concrete embodiments thereof in the accompanying drawings, in which:—

Figure 1:
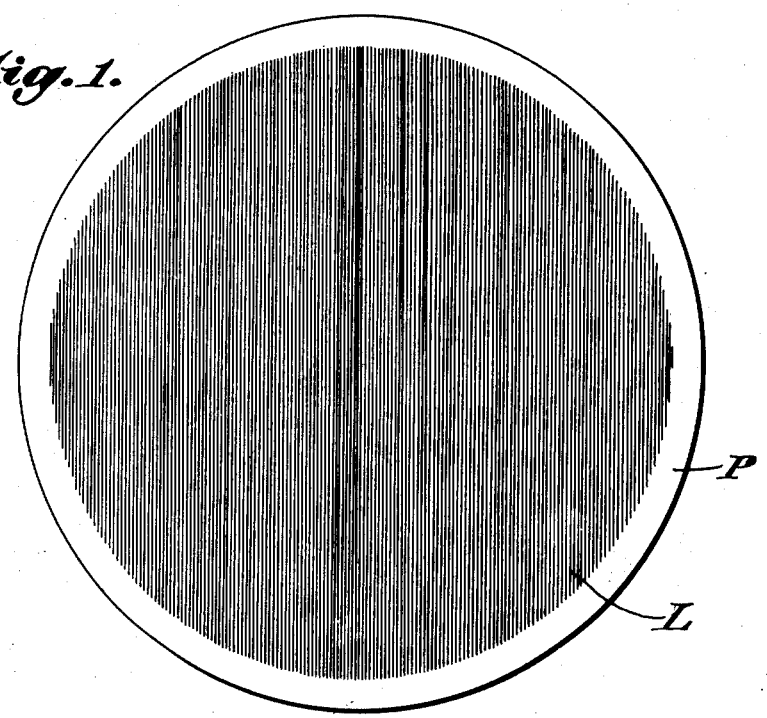
Fig. 1 is a rear view of a headlight screen.
Figure 2:
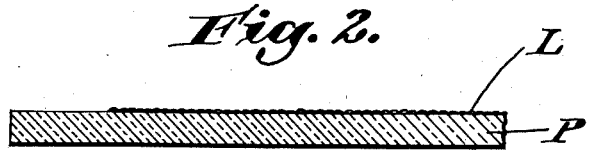
Fig. 2 is a section of a portion of the lens on an enlarged scale.
Figure 3:
Figs. 3 and 4 illustrate two typical lens formations on still further enlarged scale.
Figure 4:
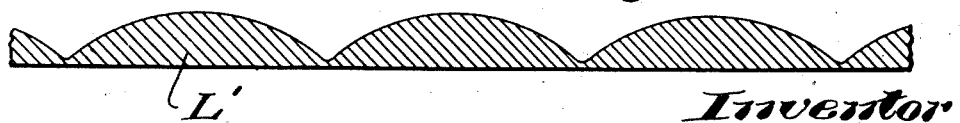

The particular embodiment of the invention illustrated in Figs. 1 and 2 comprises a glass plate P having upon one face thereof, preferably the rear face, a series of parallel vertical lenses L which have such cross-sectional contour as to produce the desired light distribution. As above stated these lenses may be either convex as shown at L' in Fig. 4 or concave or alternately concave and convex as shown at L'' in Fig. 3. The lenses are preferably of the order of a few hundredths of an inch wide, for example two or three hundredths of an inch, and a few thousandths of an inch thick, for example four thousandths of an inch, thus adding only a slight additional thickness to the lens or screen over and above the thickness of the glass plate.

A suitable light-sensitive coating in which the lenses or refracting elements are to be formed comprises bichromated gelatin which may be prepared and applied as follows: Dissolve 4 grams of ammonium bichromate in 14 c. c. of water, the bichromate dissolving at approximately 130° F. Dissolve 14 grams of gelatin in 98 c. c. of water, the gelatin being permitted to soak in the water and the water being warmed to approximately 110° F. until a homogenous watery mass results. These two mixtures, the bichromate solution and the gelatin mass, are then thoroughly mixed. This combined mixture may then be applied to the glass plate or other light-transmissive support by placing the support in a horizontal position and pouring the mixture thereupon at a temperature of approximately 110° F. to a depth of approximately one-eighth of an inch. The mixture spreads uniformly over the surface of the support and when dry has a thickness of approximately ten thousandths of an inch. Obviously the thickness of the coating and the proportions of the ingredients may be varied to suit the particular treatment subsequently employed and to produce the particular lens formation desired. For example, a decrease in the proportion of bichromate increases the contrast of the subsequent light exposure and consequently the difference between the thicker and thinner portions of the lens formation for a given exposure.

Figure 5:
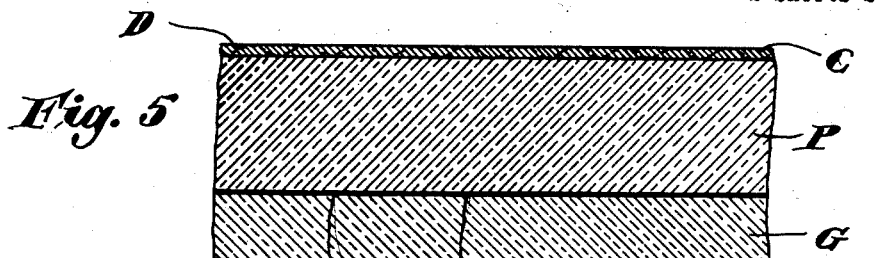
Fig. 5 illustrates one method of exposing the light-sensitive layer.

The method of exposing the light-sensitive layer illustrated in Fig. 5 where P is the glass plate and C the light-sensitive coating, involves the use of a light grid G. The particular type of grid illustrated in Figs. 5 and 6 comprises a glass plate having on one face thereof a series of opaque lines A separated by transparent lines B which may have the same width as the opaque lines. As shown in Fig. 5 the grid is placed behind the glass plate P with the lined side contacting with the glass plate and the light-sensitive coating C is exposed through the grid and through the plate. By properly predetermining the distance from the light source to the grid, the width of the lines on the grid, the dimension of the light source transversely of the lines of the grid, etc., the light-sensitive coating may be exposed to a depth bounded by a smoothly curving line which is generally sinusoidal in shape as indicated at D, the defraction effect of the grid contributing to the smoothness of the curve. For example, an exposure such as indicated by the line D in Fig. 5 may be produced by a mercury vapor lamp disposed parallel to the lines of the grid approximately four feet from the grid and having a light band approximately three-fourths of an inch wide, the glass plate P being approximately one-eighth of an inch thick and the opaque and transparent lines or bands of the grid each being approximately twenty-five thousandths of an inch wide. The exposure may be made sufficiently long to carry the crests of the line D to the outer surface of the coating C or it may be somewhat shorter.

Figure 6:
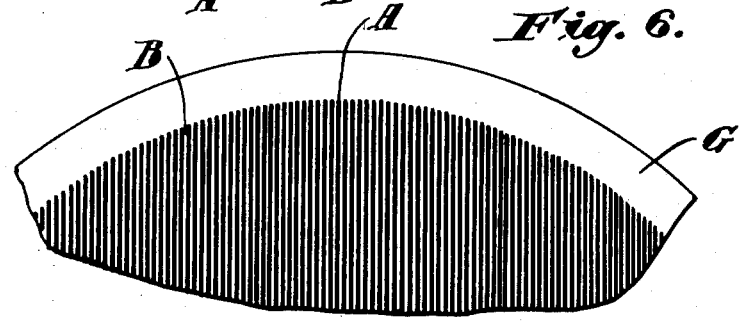
Fig. 6 is a face view of a portion of a grid adapted to be employed as illustrated in Fig. 5.
Figure 7:
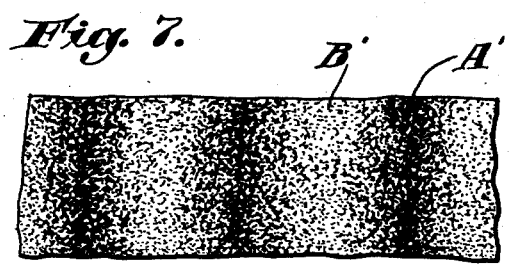
Fig. 7 is a face view of a portion of a grid or screen somewhat different from that shown in Fig. 6.

Instead of using a grid having alternate opaque and transparent sections such as shown in Fig. 6, I may employ a grid such as shown in Fig. 7 in which the transmissivity of the grid alternately and gradually increases and decreases in one dimension thereby producing relatively opaque portions A' and relatively transparent portions B' which gradually merge with each other through portions of intermediate transmissivity. By predetermining the range and rate of variation of the transmissivity of the grid in the one dimension a lens formation of any desired depth and shape may be produced.

Figure 8:
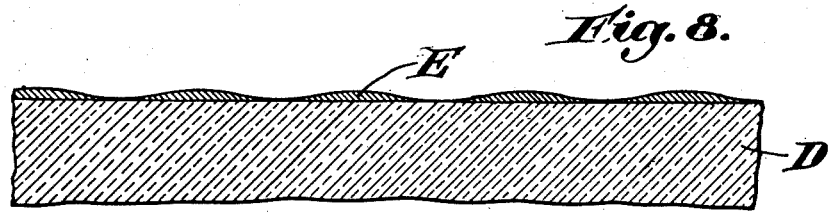
Fig. 8 is a sectional view of still a different type of grid or screen.

Fig. 8 illustrates another form of grid comprising a glass plate D having on one face thereof cylindrical ridges E formed of stained gelatin or other suitably colored material adapted to transmit light in varying degree along one dimension corresponding to the variable thickness of the ridges. For example, the ridges E may be formed according to the present invention by exposing a light-sensitive emulsion as above described or as herein after described, subsequently removing the soft unexposed gelatin, and then staining the remaining gelatin with a dye adapted to absorb the exposing light in proportion to the thickness of the ridges.

Figure 9:
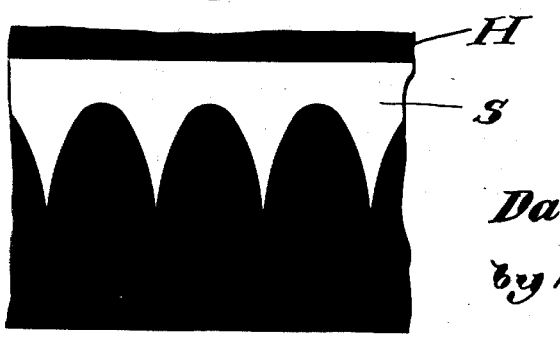
Fig. 9 illustrates a screen or shutter for use in exposing the light-sensitive layer of the lens or for use in making a grid such as illustrated in Fig. 8.

Fig. 9 illustrates a screen or shutter comprising a sheet or band of opaque material H (a portion of which is shown in black in the figure) having a slot S of variable width extending thereacross, the variation in the width of the slot depending upon the lens formation which it is desired to make. In use the light through this slot is spread over the entire light-sensitive layer in a direction perpendicular to the lengthwise axis of the slot, i. e. vertically in Fig. 9, either by motion of the slot and light-sensitive layer relatively to each other or by using, in connection with a copying lens, a lens dispersive in one direction only. Thus the light sensitive layer is exposed uniformly in the direction perpendicular to the lengthwise axis of the slot but is exposed to a variable depth parallel to the lengthwise axis of the slot. By suitably proportioning the contour of the slot S any desired variation in exposure in a direction parallel to the lengthwise axis of the slot may be obtained, the particular exposure desired being determined either experimentally or mathematically. Owing to the difficulty of making a slot having dimensions as small as those of the lens formation to be made, the shutter shown in Fig. 9 is preferably made many times larger and then employed at a distance from the light-sensitive coating in a lens system adapted to reduce the dimensions to the desired degree, for example, to approximately twenty-five thousandths of an inch wide for each lens.

A very satisfactory procedure is to make a screen or grid such as shown in Fig. 8 by means of a shutter such as shown in Fig. 9 and then to employ this grid as illustrated in Fig. 5, although it is to be understood that a shutter such as shown in Fig. 9 may be directly employed in exposing the headlight screen or other article, the contour of the slot S of the shutter being differently proportioned in the latter case to produce the desired exposure on the lens.

After the light sensitive coating has been exposed as described, the outer portion of the coating may be etched off by immersion in a suitable bath. Where the light sensitive coating comprises bichromated gelatin water makes a very suitable bath, in which case a particularly good method of bathing comprises soaking the coating in cool water for approximately fifteen minutes and then in water at a temperature of about 120° F. for approximately fifteen minutes, the warm water being agitated during the latter fifteen minutes.

The herein disclosed method of making lenses or the like is claimed in divisional application Serial No. 209,696, filed August 1, 1927.

I claim:

1. A headlight screen comprising a light-transmissive plate and a relatively soft coating of light-transmissive material thereon, the coating having parallel refractive sections adapted to alter the directional characteristics of the light passing therethrough, said sections being too wide to produce substantial color effect.

2. A headlight screen comprising a light-transmissive plate and a relatively soft coating of light-transmissive material thereon, the coating having parallel refractors adapted to spread the light predominantly in one dimension, said refractors being too wide to produce substantial color effect.

3. A headlight screen comprising a light-transmissive plate and adhering to one face thereof a series of parallel gelatinous elements adapted to alter the transmitted light predominantly in one dimension, said elements being too wide to produce substantial color effect.

4. A headlight screen comprising a light-transmissive plate and adhering to one face thereof a series of parallel gelatinous refractors adapted to spread the light predominantly in one dimension, said refractors being too wide to produce substantial color effect.

5. A headlight screen comprising a glass plate having on one face thereof a series of parallel refractors formed of light transmissive material softer than glass, said refractors being too wide to produce substantial color effect.

6. A headlight screen comprising a glass plate having on one face thereof a series of parallel cylindrical lenses formed of light transmissive material softer than glass, said lenses being too wide to produce substantial color effect.

7. A headlight screen comprising a glass plate having on one face thereof a series of parallel refractors formed of gelatinous material, said refractors being too wide to produce substantial color effect.

8. A headlight screen comprising a light-transmissive plate and adhering on one face thereof a series of parallel refractors of the order of a few thousandths of an inch thick, and too wide to produce substantial color effect.

9. A headlight screen comprising a light-transmissive plate and adhering on one face thereof a series of parallel refractors of the order of a few hundredths of an inch wide.

10. A headlight lens comprising a light-transmissive plate and adhering on one face thereof a series of parallel refractors of the order of a few hundredths of an inch wide and a few thousandths of an inch thick.

11. A headlight lens comprising a light-transmissive plate and adhering to one side thereof a series of parallel refractors composed of hardened colloidal material, said refractors being too wide to produce substantial color effect.

12. A lens comprising a light-transmissive plate and adhering to one side thereof a relatively soft coating having its outer surface regularly etched into lens formation, the distance between adjacent lens formations being too great to produce substantial color effect.

13. A lens comprising a light-transmissive plate and adhering to one side thereof a coating of light-transmissive gelatinous material having a regular pattern of lens formations etched in its outer surface, the distance between adjacent lens formations being too great to produce substantial color effect.

14. A lens comprising a glass plate and adhering to one side thereof a coating of clear gelatin having a regular pattern of lens formations etched in its outer surface, the distance between adjacent lens formations being too great to produce substantial color effect.

15. A lens comprising a light-transmissive plate and a coating of light-sensitive material having alternate sections hardened to different depths as a result of the action of light, the distance between similar points of adjacent sections being too great to produce substantial color effect.

16. A lens comprising a light-transmissive plate and a coating of bichromated material having alternate sections hardened to different depths by the action of light, the distance between similar points of adjacent sections being too great to produce substantial color effect.

17. A lens comprising a light-transmissive plate and a coating of bichromated gelatin hardened by light to varying depths from the plate outwardly, the boundary of the hardened gelatin having the contour of a smoothly curving wave, the distance between the crests of adjacent waves being too great to produce substantial color effect.

18. A lens comprising a light-transmissive support and a series of light-indurated colloid refractors on the support, said refractors being spaced too far apart to produce substantial color effect.

19. A lens comprising a series of light-indurated colloid refractors, said refractors being spaced too far apart to produce substantial color effect.

Signed by me at Boston, Massachusetts, this fifteenth day of April, 1922.

DANIEL F. COMSTOCK.